Figure 1:
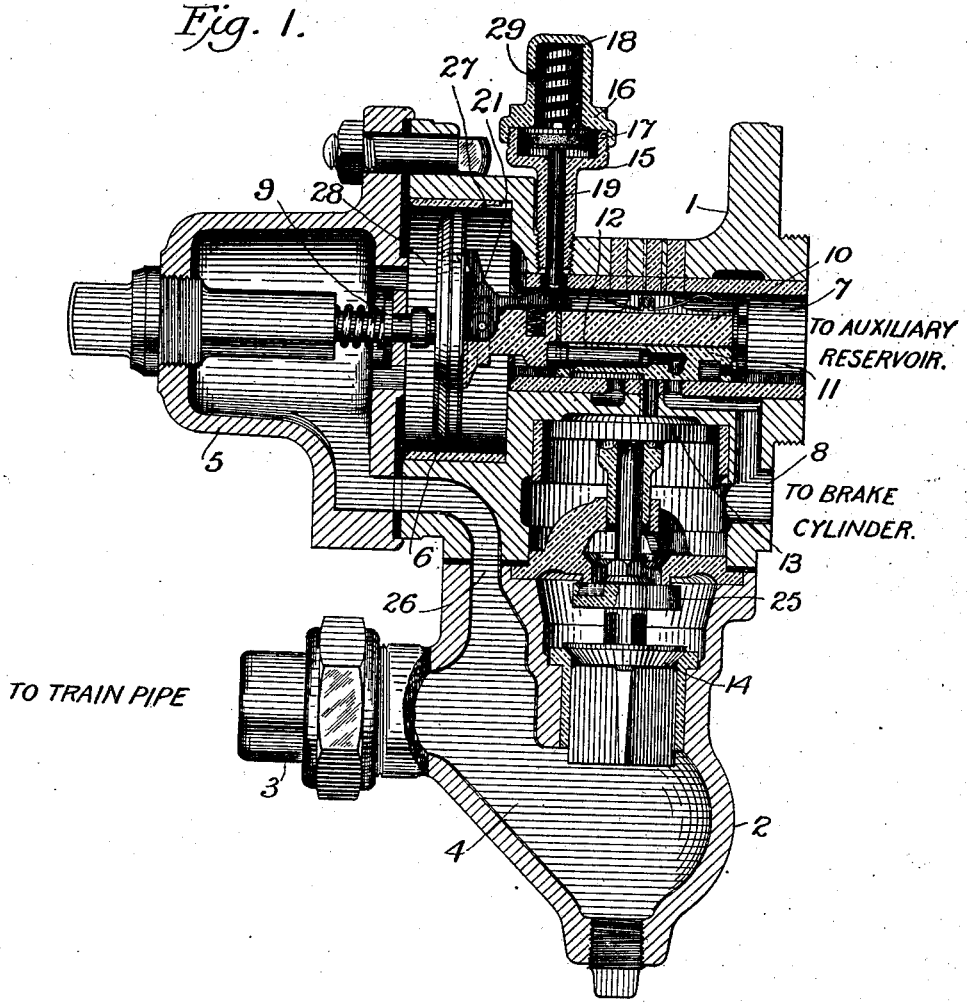

No. 727,469. PATENTED MAY 5, 1903.
E. G. SHORTT.
MEANS FOR SUPPLYING FLUID PRESSURE TO THE AUXILIARY RESERVOIRS
AND BRAKE CYLINDERS OF AIR BRAKES WHILE BRAKES ARE SET.
APPLICATION FILED MAR. 17, 1902.
NO MODEL.
2 SHEETS—SHEET 1.

WITNESSES:
James J. Duhamel
M. L. Shay.

INVENTOR
Edward G. Shortt
BY
Fred E. Tasker
ATTORNEY

No. 727,469. PATENTED MAY 5, 1903.
E. G. SHORTT.
MEANS FOR SUPPLYING FLUID PRESSURE TO THE AUXILIARY RESERVOIRS
AND BRAKE CYLINDERS OF AIR BRAKES WHILE BRAKES ARE SET.
APPLICATION FILED MAR. 17, 1902.
NO MODEL. 2 SHEETS—SHEET 2.
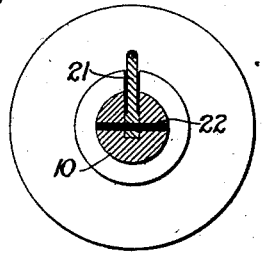
Fig. 3.
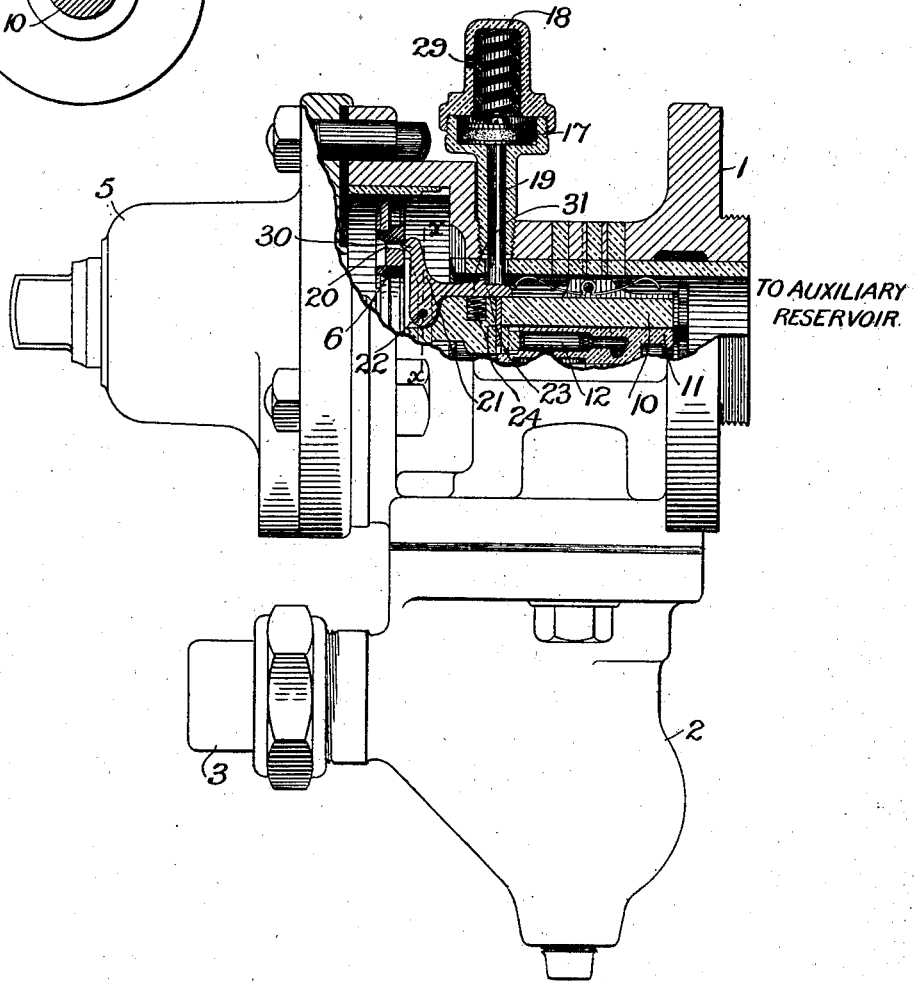
WITNESSES:
INVENTOR
Edward G. Shortt
BY
Fred E. Tasker
ATTORNEY No. 727,469.

Patented May 5, 1903.

UNITED STATES PATENT OFFICE.

EDWARD G. SHORTT, OF CARTHAGE, NEW YORK, ASSIGNOR TO INTERNATIONAL AIR BRAKE COMPANY, OF JERSEY CITY, NEW JERSEY, A CORPORATION OF NEW JERSEY.

MEANS FOR SUPPLYING FLUID-PRESSURE TO THE AUXILIARY RESERVOIRS AND BRAKE-CYLINDERS OF AIR-BRAKES WHILE BRAKES ARE SET.

SPECIFICATION forming part of Letters Patent No. 727,469, dated May 5, 1903.

Application filed March 17, 1902. Serial No. 98,485. (No model.)

*To all whom it may concern:*

Be it known that I, EDWARD G. SHORTT, a citizen of the United States of America, and a resident of Carthage, in the county of Jefferson and State of New York, have invented certain new and useful Improvements in Means for Supplying Fluid-Pressure to the Auxiliary Reservoirs and Brake-Cylinders of Air-Brakes while Brakes are Set, of which the following is a specification.

My present invention relates to fluid-pressure brakes, and refers particularly to a device for reinforcing from the train-pipe the braking pressure in the brake-cylinder while the brakes are set with the shoes applied to the wheels and simultaneously recharging the auxiliary reservoir, so as to increase the supply of fluid-pressure therein.

The object is to augment braking pressure under necessitous circumstances—such, for instance, as the running away of a train or the undue acceleration of its speed when the reservoir-air has been so depleted in consequence of previous use that the braking power derivable therefrom is insufficient to meet the needs of the situation to enable the engineer to retard, stop, or properly control the speed of the train.

The invention is primarily applicable to an air-brake mechanism which performs service applications by the use of auxiliary-reservoir air and performs emergency applications by the use of train-pipe air and reservoir-air combined in the cylinder; but of course it is applicable to various other forms of brake mechanism; and the invention consists, essentially, in a main piston, diaphragm, or abutment provided with a valve that allows air to pass through it when the valve is in graduating position and brakes are set; and also it comprises numerous details and peculiarities in the combination, construction, and arrangement of parts, substantially as will be hereinafter described and claimed.

In the annexed drawings, illustrating my invention, Figure 1 is a vertical sectional view, certain parts being shown in elevation, of my improved fluid-pressure brake mechanism whereby fluid-pressure is augmented in the brake-cylinder and also supplied to the reservoir while the brakes are set and without releasing them, the valve which controls the air-supply port through the piston being shown as closed. Fig. 2 is a similar partial sectional view, the valve controlling the air-supply port through the piston being shown as open. Fig. 3 is a detail cross-section on the line $x\ x$ of Fig. 2.

Similar characters of reference denote like parts in the different figures.

In order to illustrate the application of my present invention in actual practice, I have represented in the drawings one form of triple valve for explanatory purposes merely and with no idea of being confined strictly thereto, since the invention is designed for use with numerous different kinds of valves having the same general construction and function. Proceeding to briefly describe this specimen valve, 1 denotes the valve-body; 5, the cap thereon, containing a graduation-stop 9; 13, the emergency-valve piston; 25, the emergency-valve; 14, the check-valve; 2, the check-valve case, containing train-pipe space 4 and having train-pipe connection 3; 6, the main piston, diaphragm, or abutment, having a piston-rod 10 and arranged in connection with the slide-valve 11 and the graduation-valve 12. Train-pipe air, which enters the triple valve through inlet 3, flows through passage 26 into the cap 5 and then into the piston-chamber 28, wherein is the main piston 6, and if this main piston is in proper position to uncover and open the feed-port 27 the fluid-pressure will feed through port 27 into the slide-valve chamber 7 and thence into the auxiliary reservoir, which is in communication with said chamber 7. Further, the body 1 of the triple valve communicates at 8 with the brake-cylinder, the connection being made in any desired manner. In the operation of a valve of this general character when train-pipe pressure is reduced for the purpose of making a service or graduation stop the piston 6 moves toward the left and so adjusts the slide and graduation valves that air may be delivered from the reservoir to the brake-cylinder, and when train-pipe pressure is reduced to make an emergency stop the piston 6 makes a movement of such a character as to so actuate the slide and graduation valves that both train-pipe air and auxiliary-reservoir air may be transferred together to the brake-cylinder.

Up to this point my description of the triple valve has been for explanatory purposes merely and has related to old material and known parts and has not intended to touch upon my present improvements.

I will now proceed to describe the novel and original matter of which the present invention consists.

In the wall of the slide-valve chamber 7 is screwed or otherwise secured a casing 15, containing a piston 17, having a stem 19, the end of which stem projects into the slide-valve chamber 7 at a point not far distant from the chamber 28, which contains the main piston 6. The piston-stem 19 is angular or winged, and the passage which contains it is preferably round or circular in cross-section, so that fluid-pressure may pass along by the side of the stem from the interior of the slide-valve chamber 7 to act against the piston 17. A suitably-shaped cap 16 is secured to the casting 15 by being screwed thereon, as shown, or otherwise attached. This cap contains a spring 18, that bears against that side of piston 17 which is farthest from the slide-valve chamber 7, being consequently the side opposite to the side which is exposed to air-pressure, and this cap 16 has a lateral port 29 for vent to atmosphere. Obviously the piston 17 is constantly exposed to the auxiliary-reservoir pressure which fills the slide-valve chamber 7. This pressure is sufficient to overcome the strength of the spring 18 and keep the piston 17 in the outer end of its casing and the end of stem 19 withdrawn from the slide-valve chamber 7, except at such times as said pressure, in consequence of having been frequently drawn upon for braking purposes, has been reduced to a low point—that is to say, for example, as low as twenty or thirty pounds—at which time the spring 18, having been so set as to have a strength sufficient to overcome this twenty or thirty pound degree of pressure, will thrust the piston 17 to the other end of its chamber and cause the end of stem 19 to project into the interior of the slide-valve chamber. It may be proper to suggest that piston 17 has only a very short movement, the extent of its throw only being enough to allow the end of the stem 19 to pass easily into its projecting position or to be withdrawn therefrom into a position where it will be non-projecting.

The piston 6 is perforated at a suitable point between its center and periphery with a port or orifice 20 extending transversely through it. A valve 21 is pivoted to the rear side of the piston or to the stem thereof at 22, said valve having a beveled or pointed end 30, that opens or closes the orifice 20, and this valve 21 has a rearwardly-extending arm or latch 23, that is notched or formed with a shoulder 31, and said latch is so situated as to be in a position to be pressed and moved at times by the end of the piston-stem 19 when the spring 18 extends and causes the piston 17 to move to the other end of its stroke and the end of the piston-stem 19 to concurrently project into the chamber 7.

In a small recess in piston-stem 10 is a spiral spring 24 of sufficient strength to resist air-pressure, which spring bears against the under side of the valve-latch 31 and acts to lift it into the position shown in Fig. 1, thereby causing the port 20 in piston 6 to be closed by the valve projection 30. When the piston 17 reaches a position in that end of its chamber which is nearest the slide-valve chamber 7, as shown in Fig. 2, the stem 19 will, if the main piston 6 be in the position shown in the drawings, press the valve-latch 23, opening the valve in the piston by uncovering the feed-port 20, and as the shoulder 31 on the valve-arm 23 will engage stem 19 upon any attempt of the piston 6 to move into release position said piston 6 will be kept locked in the position shown until sufficient pressure has passed through port 20 to raise the pressure in the slide-valve chamber (and consequently in the brake-cylinder and auxiliary reservoir) to a degree sufficient to overcome the normal strength of the spring 18, and thus permit the piston 17 to retreat so as to disengage the stem 19 from the shoulder 31.

In making a service stop the reduction of pressure in the train-pipe will cause the piston 6 to move toward the left until it comes in contact with the graduation-stop 9. Now it often happens that as the result of successive and repeated applications of the brakes the supply of air in the reservoir is drawn upon to such an extent that there will not be enough air on hand to give the necessary braking pressure when it is needed to control the speed of the train when the latter is running away or when the speed has been increased to such an extent as to become dangerous and to require immediate action of some sort. When the supply of air has thus been depleted, it would obviously be impossible to release brakes and obtain a new supply in the reservoir in the usual way, for with the train running at high speed brakes must not be let off. At a time like this, therefore, when it is of the highest moment to keep all the pressure in the brake-cylinder that is already there and to find some way of supplying additional pressure thereto as well as to furnish a new supply of air to the reservoir, my present invention becomes of the greatest value, for while the brakes are on, with the main piston 6 in its graduation or running position, as shown in the drawings, the pressure of air in the slide-valve chamber having been reduced to the point where the piston-stem 19 projects into said chamber, the valve-arm 23 will be pressed against piston-stem 10 by piston-stem 19, the valve 21 will oscillate on its pivot 22, and the valve projection 30 will be removed from the port 20, so that train-pipe air arriving in the chamber 28 through the port 26 can readily pass through the port 20 into the slide-valve chamber and thence to the brake-cylinder to augment braking pressure there and to the auxiliary reservoir to recharge it, and the shoulder 11 being against the piston-stem 19 will prevent the piston 6 from passing to release position. This flow of air through the port 20 while it is open will continue until the pressure in the slide-valve chamber and against the piston 17 has risen high enough to overcome the strength of spring 18 and cause such a movement of the piston 17 as will disengage stem 19 from the piston-valve arm and allow the valve to close the port 20.

The device 17 may be a piston, diaphragm, or abutment, and I reserve the liberty of also making other changes by the substitution of equivalent parts.

Having thus described my invention, what I claim as new, and desire to secure by Letters Patent, is—

1. In a fluid-pressure brake mechanism, a triple valve having a piston provided with a port running transversely through it, a valve controlling said port, and means acted on by the reduction of the supply of braking pressure to a predetermined point for the purpose of opening said valve and temporarily locking it in its open position so that air may pass through the piston-port while brakes are set to augment braking pressure and recharge the supply-reservoir.

2. In a fluid-pressure brake mechanism, the combination with the main piston of a triple valve, said piston having a feed-port, of a valve controlling said port, a piston exposed to the reservoir or supply of pressure, and having a stem which is adapted to lock the valve temporarily in an open position, and a spring acting against the latter piston to move the same when the pressure to which it is exposed drops to a predetermined point.

3. In a fluid-pressure brake mechanism, the combination with a triple valve having a main piston provided with a feed-port running transversely through it, of a valve controlling said port and having a spring-provided arm, and a piston exposed to reservoir-pressure, and having a stem adapted to engage said arm.

4. In a fluid-pressure brake mechanism, the combination with a main piston, having a feed-port running transversely through it, of a valve controlling said port and having a notched arm provided with a spring, a casing on the wall of the triple-valve body, a piston in said casing having a stem adapted to engage the arm of the piston-valve, and a spring bearing on said piston, substantially as described.

5. In a fluid-pressure brake mechanism, the combination with a triple valve having a piston provided with a feed-port, of a valve controlling said port, a piston exposed to reservoir-pressure, and having a stem adapted to lock said valve in an open position temporarily, and yielding means set to move the latter piston when the pressure to which it is exposed drops to a predetermined point.

Signed at Carthage, New York, this 18th day of January, 1902.

EDWARD G. SHORTT.

Witnesses:
W. W. SWEET,
S. H. GALLAGHER.